Sept. 27, 1938. W. K. PORTEOUS 2,131,711
SEWAGE DISPOSAL
Filed April 2, 1937 2 Sheets-Sheet 1

INVENTOR
W. K. Porteous
BY Joseph Hirsch
ATTORNEY

Patented Sept. 27, 1938

2,131,711

UNITED STATES PATENT OFFICE 2,131,711

SEWAGE DISPOSAL

William King Porteous, Twickenham, England, assignor of fifteen percent to William Thomas Towler, London, England Application April 2, 1937, Serial No. 134,511
In Great Britain April 6, 1936

8 Claims. (Cl. 210—2)

The regulations at some ports in connection with the discharge of ships' sewage are such that serious loss is occasioned to ship owners because their vessels are unable to enter such ports unless very stringent precautions be taken to obviate any such discharge, and the object of the present invention is to overcome that disadvantage by providing ships with a small sewage treatment plant which will permit compliance with such regulations.

To this end, and in accordance with the invention, ships' sewage is led to a tank from which, when the vessel is at sea, it is discharged overboard, but from which, when the vessel is in port, it is delivered to a disintegrator and thence to a centrifuge by which sludge is separated, the effluent being discharged overboard, whilst the sludge is discharged into, and stored in, a tank, until an opportunity occurs to discharge it overboard.

If desired, the sludge coming from the disintegrator, instead of being discharged directly into, and stored in, a tank, is discharged into a vessel or into one or more of a series of vessels where it is heated to about 300° F. or over to coagulate and sterilize the solid matter, and whence it is discharged through a cooler and stored in a tank, until an opportunity occurs to discharge it overboard.

In some cases, it is preferable that the output from the cooler should be thickened, e. g., in a centrifuge from which the effluent is discharged overboard, whilst the resultant sludge is conveyed to the storage tank. Alternatively, the output from the cooler may be conveyed direct to the storage tank, allowed to thicken by settlement, and the effluent decanted and discharged overboard.

Preferably the vessels in which the sludge is heated are of such number and so arranged that whilst one is being charged, the contents of another are being heated, and those of a third are being discharged to the cooler, the arrangement being somewhat similar to that described in the specification of my British Letters Patent No. 420,720.

It is to be observed that the plant required for putting this invention into practice will occupy but small space on board ship, and to some extent can be arranged in what is, otherwise, waste space, as the effluent which can be discharged overboard constitutes the bulk of the sewage and that which must be stored, whilst the vessel remains in port, is of comparatively small volume and in some cases, is sterilized.

Figure 1:
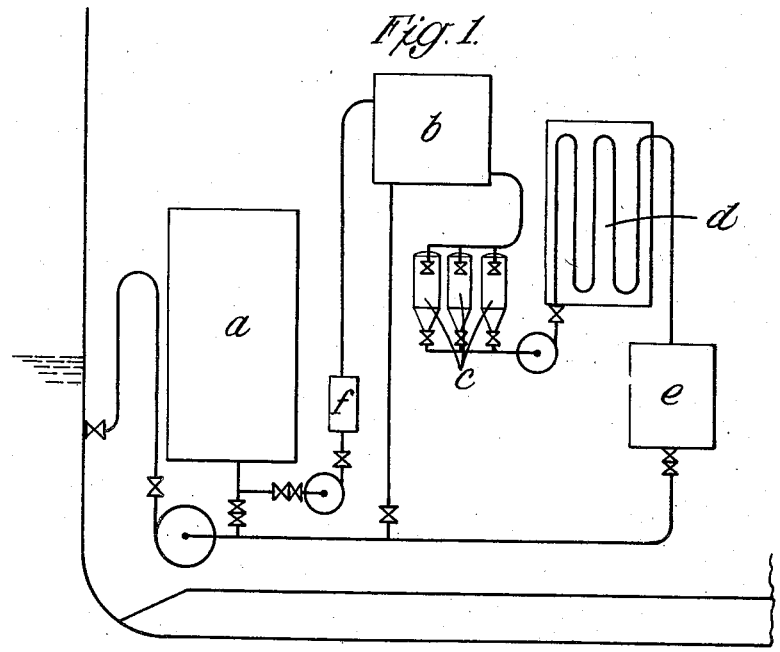
Figure 2:
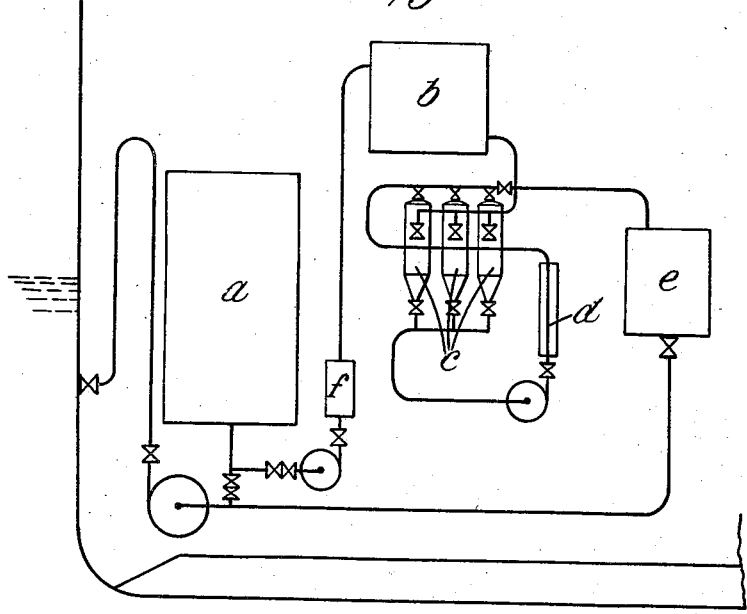
Figure 3:
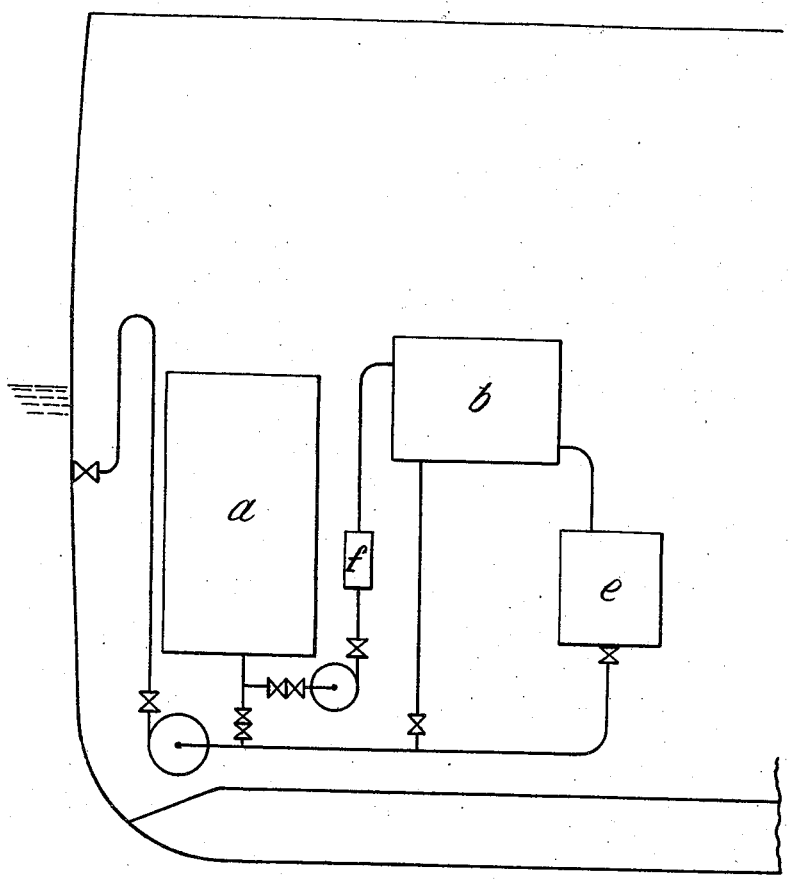

The invention is illustrated diagrammatically by the accompanying drawings, Figure 1 showing one arrangement, Figure 2 a modification of the arrangement shown in Figure 1, and Figure 3 showing a simpler arrangement.

As shown in Figure 1 ship's sewage is led to a tank $a$ from which, when the vessel is at sea, it is discharged overboard, but from which, when the vessel is in port, it is delivered to a disintegrator $f$ and thence to a centrifuge $b$ by which sludge is separated, the effluent being discharged overboard, whilst the sludge is discharged into one of three vessels $c$ $c$ $c$, where it is heated to about 300° F. or over to coagulate and sterilize the solid matter, and whence it is discharged through a cooler $d$ and stored in a tank $e$ until an opportunity occurs to discharge it overboard.

The arrangement of vessels $c$ $c$ $c$ is such that whilst one is being charged, the contents of another are being heated, and those of a third are being discharged to the cooler $d$.

The arrangement shown in Figure 2 is similar to that described with reference to Figure 1 except that the vessels $c$ $c$ $c$ and cooler $d$ are so connected that the contents of a vessel $c$, instead of being discharged through the cooler $d$ directly into the tank $e$, may be circulated through said vessel $c$ and cooler $d$ for as long as may be desired before being discharged to the tank $e$.

Figure 3 illustrates a simpler arrangement in which the vessels $c$ $c$ $c$ and cooler $d$ are omitted the sewage being led to the tank $a$ from which, when the vessel is at sea, it is discharged overboard, but from which, when the vessel is in port, it is delivered to the disintegrator $f$ and thence to the centrifuge $b$ by which sludge is separated, the effluent being discharged overboard, whilst the sludge is discharged into, and stored in, the tank $e$ until an opportunity occurs to discharge it overboard.

I claim:

1. A method of disposing of ships' sewage which comprises leading the sewage to a place of storage, withdrawing the sewage from the latter and subjecting it to a disintegrating treatment, centrifuging the mass, discharging the effluent overboard, and leading the sludge to a place of storage.

2. A method of disposing of ships' sewage which comprises leading the sewage to a place of storage, withdrawing the sewage from the latter and subjecting it to a disintegrating treatment, centrifuging the mass, discharging the effluent overboard, heating the discharged sludge to about 300°

F., cooling the sludge, and then leading it to a place of storage.

3. A method of disposing of ships' sewage which comprises leading the sewage to a place of storage, withdrawing the sewage from the latter and subjecting it to a disintegrating treatment, centrifuging the mass, discharging the effluent overboard, discharging the sludge into one of a series of vessels in succession, heating the sludge in such vessel to about 300° F., cooling the sludge, and then leading it to a place of storage.

4. A method of disposing of ships' sewage which comprises leading the sewage to a place of storage, withdrawing the sewage from the latter when the ship is in port and subjecting it to a disintegrating treatment, centrifuging the mass to separate the sludge, discharging the effluent overboard whilst the sludge is discharged into, and stored in, a tank until an opportunity occurs to discharge it overboard.

5. A method of disposing of ships' sewage which comprises leading the sewage to a place of storage, withdrawing the sewage from the latter when the ship is in port and subjecting it to a disintegrating treatment, centrifuging the mass to separate the sludge, discharging the effluent overboard whilst the sludge is discharged into a vessel, where it is heated to about 300° F., to coagulate and sterilize the solid matter, cooling the sludge and then storing it until an opportunity occurs to discharge it overboard.

6. A method of disposing of ships' sewage which comprises leading the sewage to a place of storage, withdrawing the sewage from the latter when the ship is in port and subjecting it to a disintegrating treatment, centrifuging the mass to separate the sludge, discharging the effluent overboard whilst the sludge is discharged into one of a series of vessels in succession where it is heated to about 300° F. to coagulate and sterilize the solid matter, cooling the sludge and storing it until an opportunity occurs to discharge it overboard.

7. A method of disposing of ships' sewage as claimed in claim 5, according to which sludge is circulated through the vessel in which it was heated and through a cooler prior to being discharged to the place of storage.

8. A method of disposing of ships' sewage as claimed in claim 6, according to which sludge is circulated through the vessel in which it was heated and through a cooler prior to being discharged to the place of storage.

WILLIAM KING PORTEOUS.